United States Patent [19]

Mallory

[11] 4,007,081

[45] Feb. 8, 1977

[54] TIRE BUILDING APPARATUS

[75] Inventor: Edwin E. Mallory, Niles, Mich.

[73] Assignee: National-Standard Company, Niles, Mich.

[22] Filed: Nov. 11, 1974

[21] Appl. No.: 522,484

[52] U.S. Cl. ................................ 156/417; 156/420

[51] Int. Cl.[2] ........................................ B29H 17/26

[58] Field of Search .......... 156/414, 415, 417, 418, 156/420

[56] References Cited

UNITED STATES PATENTS

| | | | |
|---|---|---|---|
| 3,536,566 | 10/1970 | Frazier et al. | 156/415 |
| 3,560,302 | 2/1971 | Missioux | 156/415 |
| 3,654,025 | 4/1972 | Winzer et al. | 156/415 |
| 3,767,509 | 10/1973 | Gazuit | 156/415 |
| 3,833,444 | 9/1974 | Mallory | 156/417 |
| 3,833,445 | 9/1974 | Mallory et al. | 156/420 |
| 3,867,230 | 2/1975 | Vanhorn et al. | 156/417 |

*Primary Examiner*—Charles E. Van Horn
*Assistant Examiner*—John E. Kittle
*Attorney, Agent, or Firm*—Johnson, Dienner, Emrich & Wagner

[57] ABSTRACT

Tire building apparatus including an intermediate radially expandable drum. Fluid pressure operated means are provided for effecting at least partial actuation of expanding and contracting means for the drum, and centering means are provided for maintaining the transverse center plane of the drum in a constant axial position during expansion and contraction of the latter. The fluid pressure operated means are incorporated with a pair of axially movable carrier means on opposite sides of the transverse center plane, and tire bead locating and supporting means are incorporated with each of the carrier means. Positive drive means are provided for axially moving the carrier means toward and away from each other for effecting in conjunction with the fluid pressure operated means actuation of the drum expanding and contracting means. Said positive drive means also serves to effect moving of the tire bead locating and supporting means axially symmetrically of the transverse center plane.

16 Claims, 25 Drawing Figures

Fig. 3.
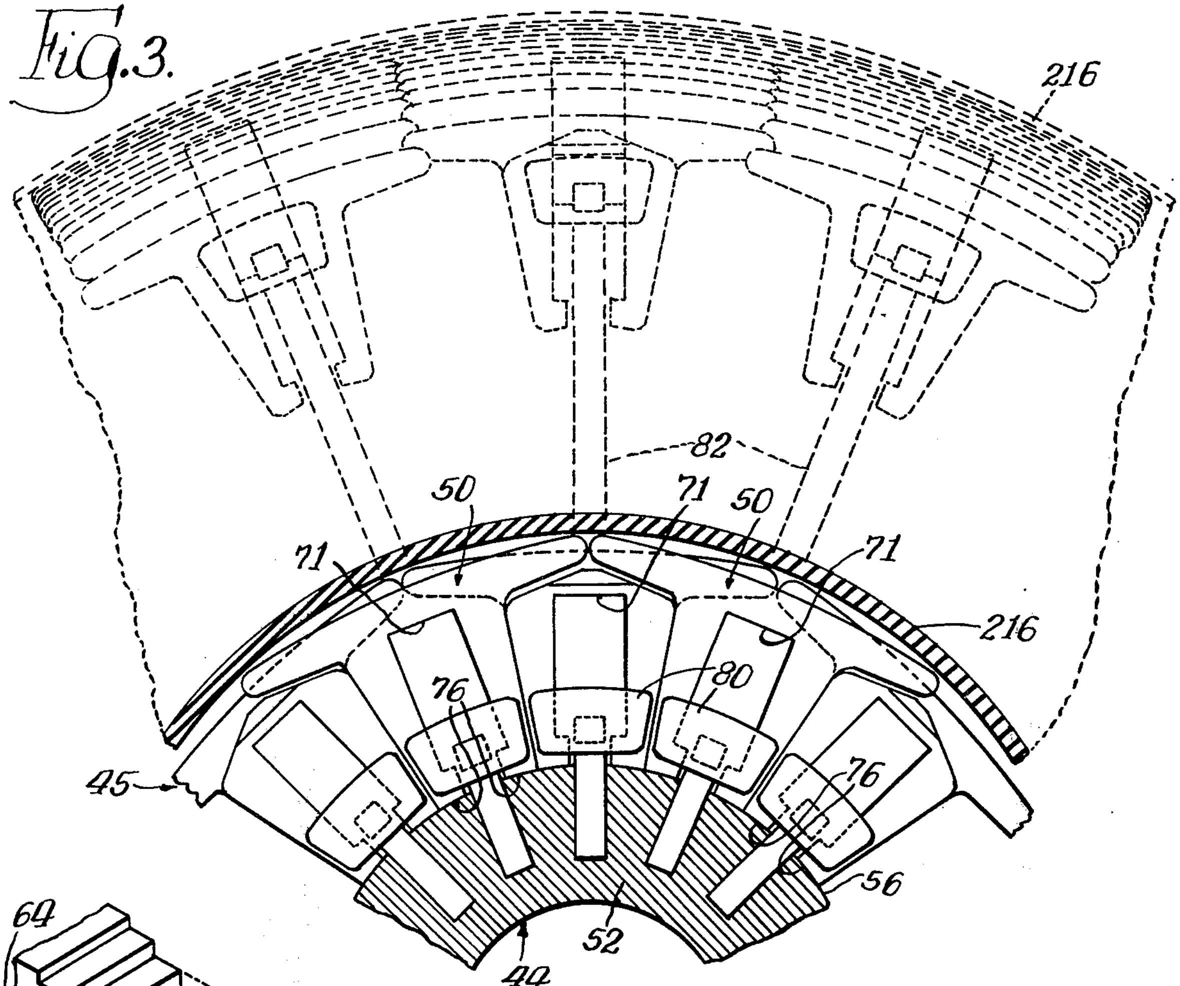
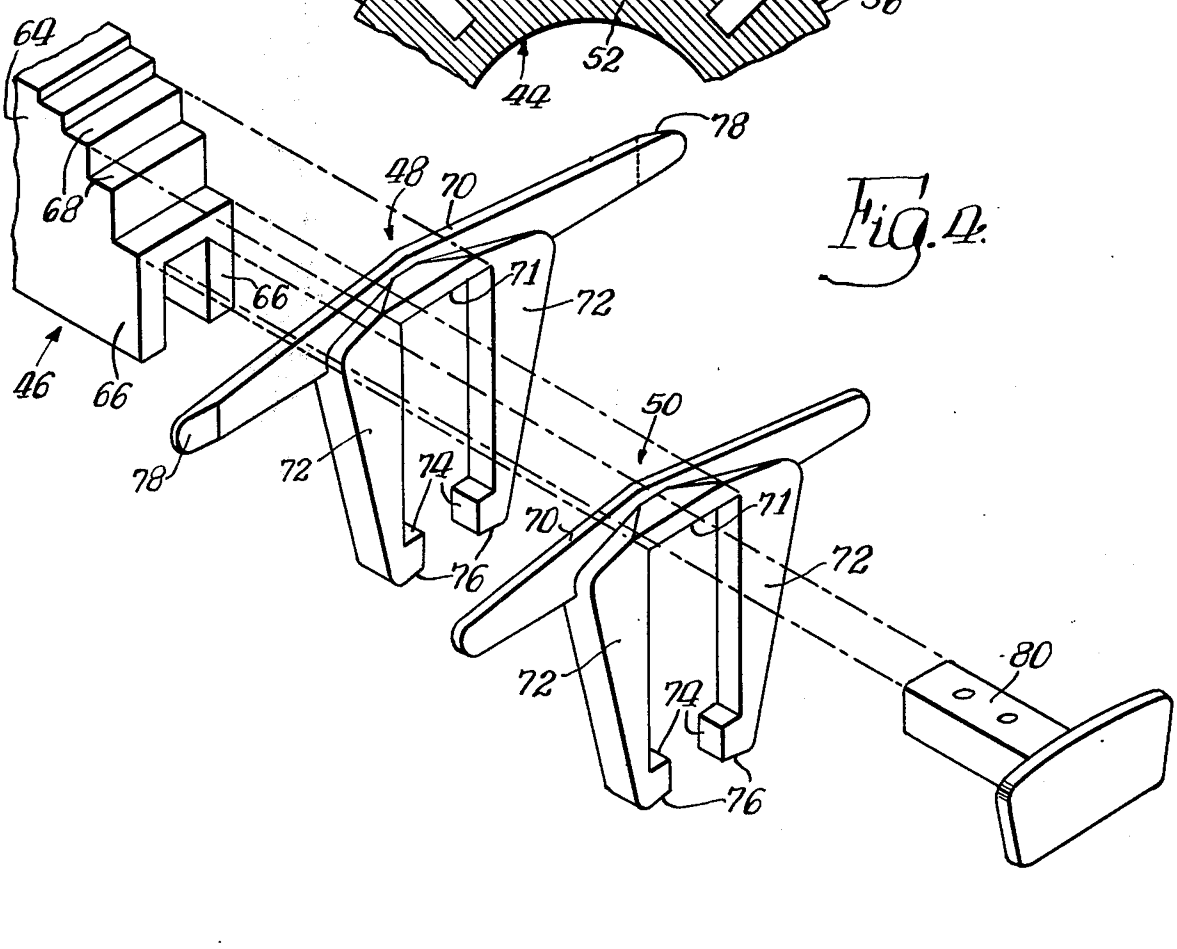
Fig. 4.

TIRE BUILDING APPARATUS

BACKGROUND OF THE INVENTION

Tire building apparatus of the type to which the present invention pertains conventionally comprises an intermediate radially expandable drum about which tire material is adapted to be arranged in substantially cylindrical form. Tire bead locating and supporting means are arranged axially outwardly of the intermediate drum, and are operative to lock the tire material with adjacently located tire beads. Thereafter, the intermediate drum is expanded radially, while the locked tire beads are moved axially inwardly.

With known tire building apparatus of the type indicated above, and because of the nature of the operating mechanism thereof, it has been difficult to obtain an accurate bead lock, an accurate bead set dimension, accurate control of the movement of the beads during expansion of the tire building drum, and ultimately a precisely symmetrical tire.

SUMMARY OF THE INVENTION

The tire building apparatus of the present invention comprises an intermediate radially expandable drum with which is associated drum expanding and contracting means.

Fluid pressure operated or resilient expansion means are provided as part of the intermediate drum expansion contracting means and for effecting at least partial actuation of the intermediate drum expansion, and centering means are provided for maintaining the transverse center plane of the drum in a constant axial position during expansion and contraction of the drum.

Tire bead locating and supporting means are arranged axially outwardly of the intermediate drum, and include radially movable bead lock clamp means.

The fluid pressure operated means and the tire bead locating and supporting means are incorporated with a pair of axially movable carrier means on opposite sides of the transverse center plane of the drum. Positive drive means are provided for axially moving the carrier means toward and away from each other. Axial movement of the carrier means effects in conjunction with the fluid pressure operated means actuation of the drum expanding and contracting means. Axial movement of the carrier means also effects axial movement of the tire bead locating and supporting means symmetrically of the transverse center plane of the drum. The apparatus further includes positive stop means engageable by the carrier means for establishing the axially outer position of the tire bead locating and supporting means.

By virtue of the indicated relationship of the various elements and operation thereof, the tire building apparatus of the present invention permits the construction of a superior tire than has heretofore been possible. More specifically, the apparatus establishes an accurate bead set dimension, provides an accurate bead lock, affords accurate control of the movement of the beads during expansion of the tire building drum, and ultimately forms a precisely symmetrical tire. Additionally, in relation to known comparable apparatus, the tire building apparatus of the present invention embodies fewer parts, is less expensive to fabricate, and is simpler and more efficient in operation.

BRIEF DESCRIPTION OF THE DRAWINGS

FIG. 3 is a partial transverse sectional view taken substantially along the line 3—3 in FIG. 1*b* looking in the direction indicated by the arrows, with certain parts being omitted for purposes of clarity, and showing in solid lines the intermediate drum in collapsed position and in dotted lines the intermediate drum in expanded position;

FIG. 4 is an exploded perspective view showing how typical outer and intermediate supporting members are assembled in a segment of the intermediate drum;

DESCRIPTION OF THE PREFERRED EMBODIMENT

Figure 1A:
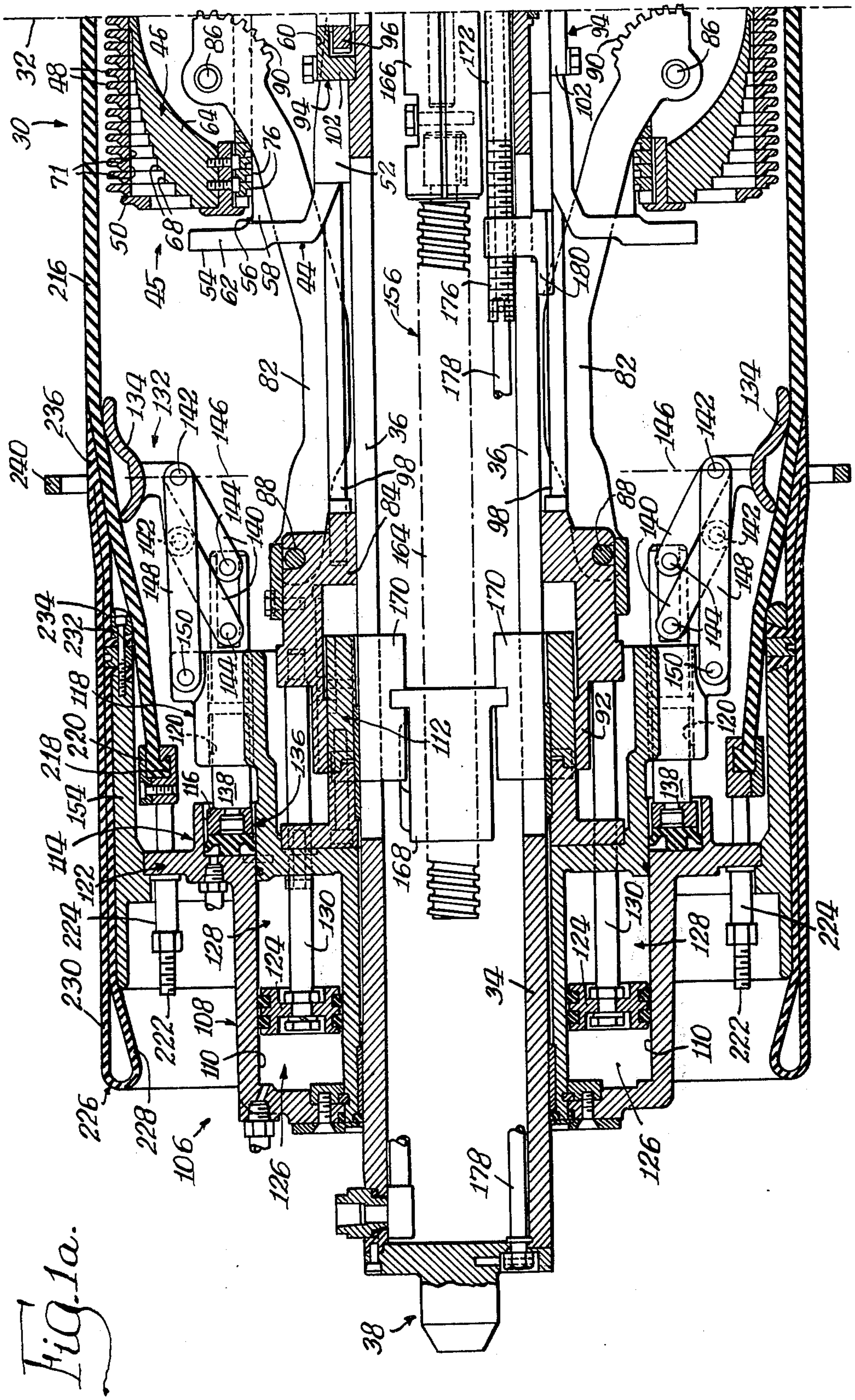
FIGS. 1*a* and 1*b*, joined in end-to-end relation on the dot-dash centerline, constitute a longitudinal sectional view of tire building apparatus, in collapsed position, embodying the principles of the present invention.
Figure 1B:
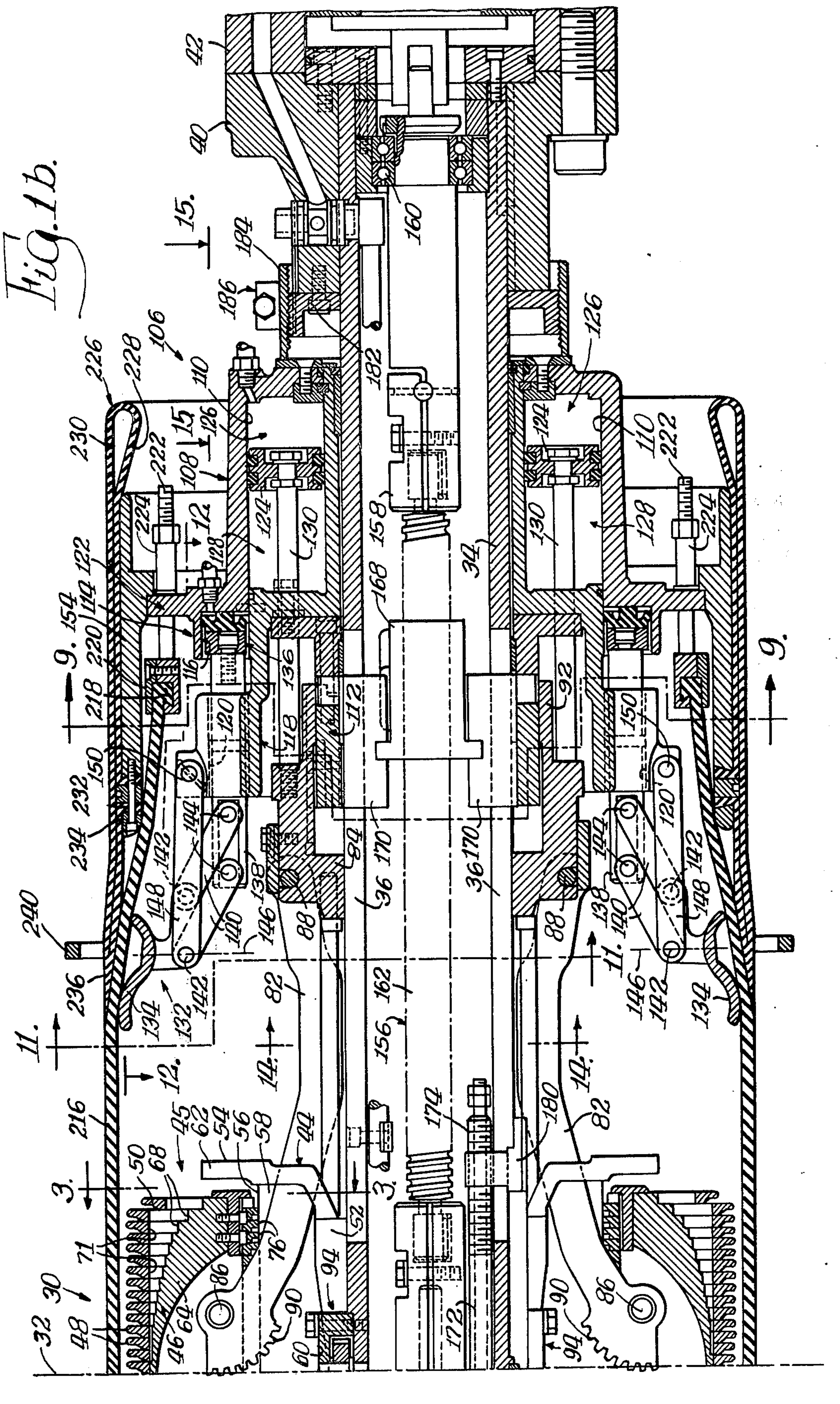

Referring now to FIGS. 1*a* and 1*b*, the tire building apparatus shown therein comprises an intermediate radially expandable drum assembly 30 which is symmetrical on opposite sides of the transverse center plane 32. Extending coaxially through the drum assembly 30 is a hollow longitudinal main shaft 34 which is formed with two pairs of diametrically opposed axial slots 36. Secured to the left end of the shaft 34 is a pilot 38. Secured on the right end of the shaft 34 is a mounting flange 40 which is secured to a flange portion 42 of the tire building machine drum drive shaft.

The intermediate drum assembly 30 includes a radially inner guide block 44, and a radially outer expandable drum 45. The drum 45, which presents a firm deck in both contracted and expanded positions, comprises circumferentially arranged deck segments 46, intermediate supporting members 48, and end supporting members 50.

The guide block 44 is mounted on the hollow shaft 34 symmetrically of the transverse center plane 32. The block 44 comprises a hub 52 and opposed end flanges 54. The hub 52 presents an outer cylindrical surface 56, and is provided with circumferentially spaced outer axial slots 58 and diametrically opposed inner axial cavities 60. The end flanges 54 are provided with slots 62 aligned with the slots 58.

Each deck segment 46 is formed with a body portion 64 of inverted U-shape in cross section (as shown in FIG. 4) having two spaced apart radially inwardly extending arm portions 66 and presenting radially outer stepped positioning shoulders 68.

Each supporting member 48 and 50, as shown in FIG. 4, is of generally T-shaped configuration. These members each comprise a circumferentially curved intermediate body portion 70 with a radially inner surface 71, and spaced apart radially inwardly extending arms 72 having inwardly extending end flanges 74 with radially inner surfaces 76. The intermediate supporting members 48 have tapered outer end portions 78 of less cross-sectional area than the cross-sectional area of the intermediate body portions 70. Each group of supporting members 48 and 50 is maintained in axially assembled position on the associated deck segment 46 by a suitable end anchor member 80.

Figure 5:
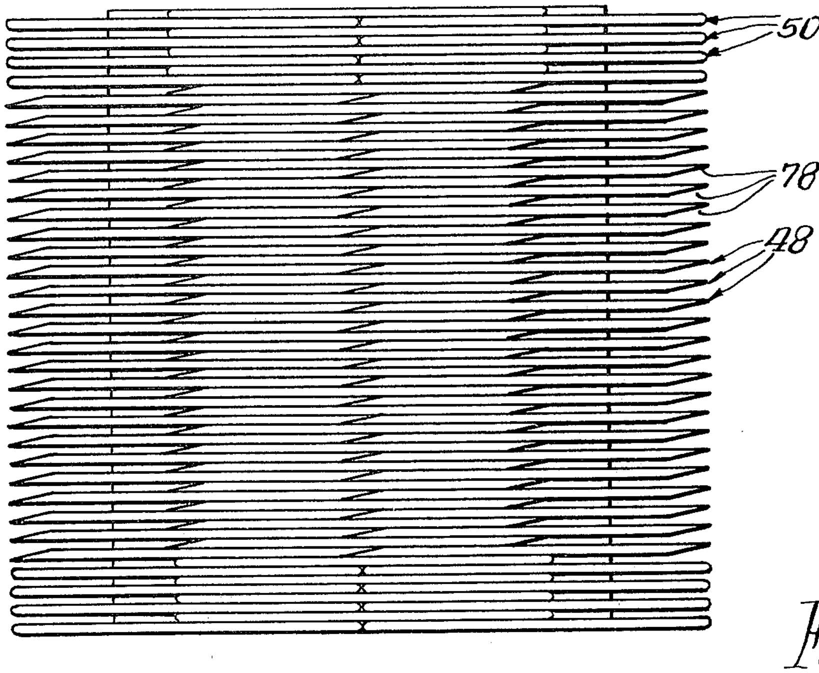
FIG. 5 is a plan view of three adjacent segments of the intermediate drum showing the relationship of the supporting members in the collapsed position of the intermediate drum.
Figure 6:
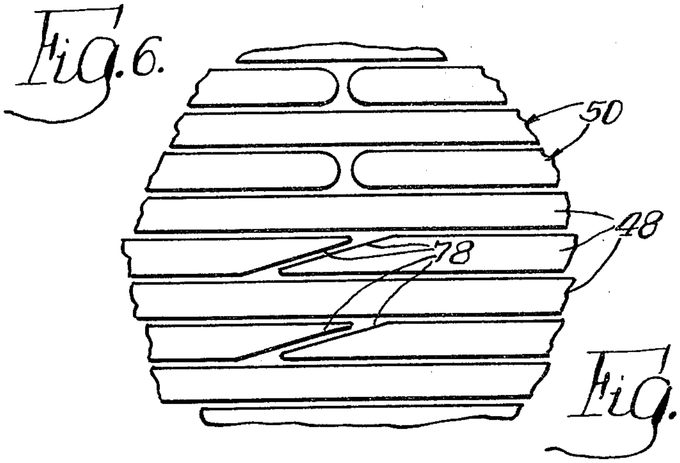
FIG. 6 is a detailed enlarged view of a portion of FIG. 5.

In the collapsed position of the intermediate radially expandable drum 45, as shown in FIGS. 1*a*, 1*b* and 3, the inner surfaces 76 of the supporting members 48 and 50 engage the outer surface 56 of the guide block 44 serving to dispose the several supporting members 48 and 50 in positions defining a substantially cylindrical surface. Also, as shown in FIGS. 5 and 6, the tapered outer end portions 78 of the intermediate supporting members 48 interleave with the tapered outer end portions 78 of once circumferentially removed intermediate supporting members 48.

Figure 8:
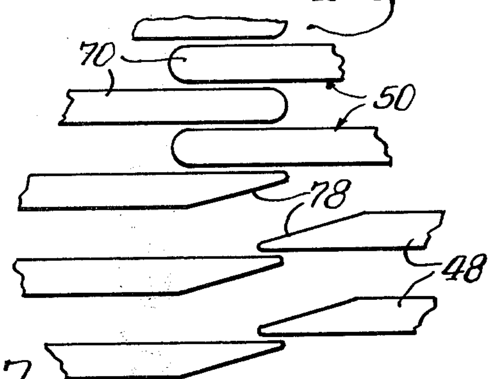
FIG. 8 is a detailed enlarged view of a portion of FIG. 7.
Figure 7:
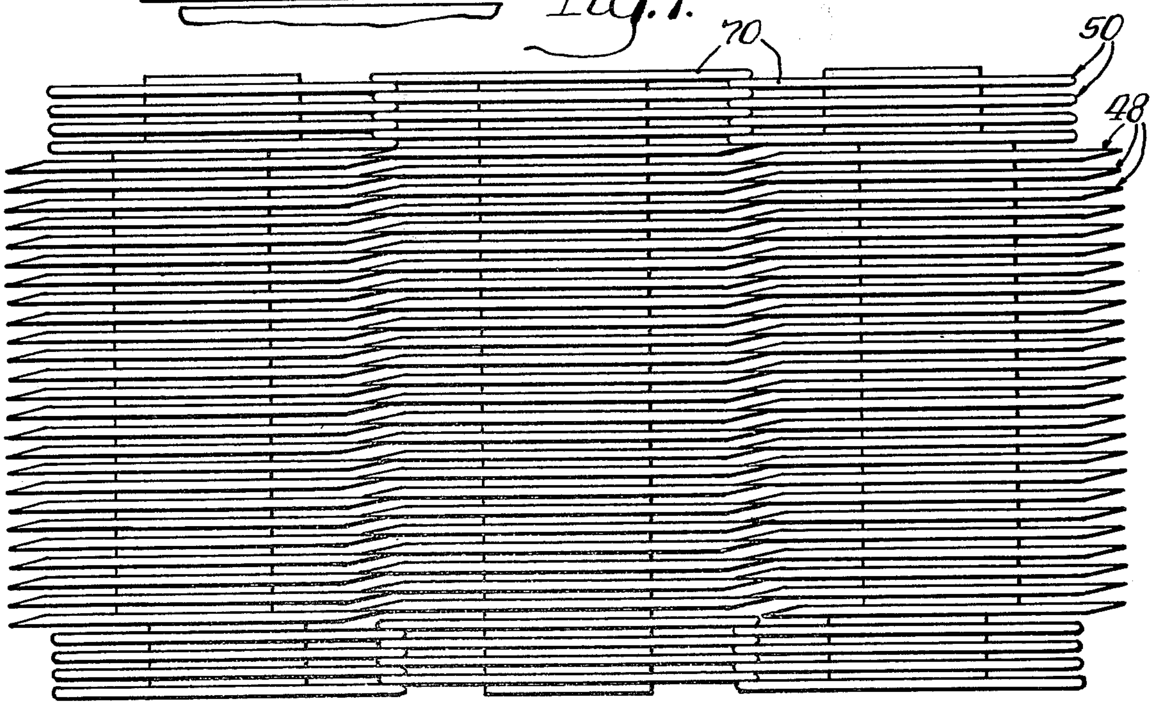
FIG. 7 is a plan view similar to FIG. 5, but showing the relationship of the supporting members in the expanded position of the intermediate drum.

Upon expansion of the intermediate drum 45, the inner surfaces 71 of the supporting members 48 and 50 are engaged by the shoulders 68 of the deck segments 46, and the supporting members 48 and 50 are disposed in positions (shown in FIG. 2 and in dotted lines in FIG. 3) defining a configuration conforming to that of the crown portion of the carcass of a cured tire. Also, in the expanded position of the intermediate drum 45, as shown in FIGS. 7 and 8, the intermediate body portion 70 of the end supporting members 50 interleave with the intermediate body portions 70 of adjacent end supporting members 50, and the tapered end portions 78 of the intermediate supporting members 48 interleave with the tapered end portions 78 of adjacent intermediate supporting members 48.

Means for expanding and contracting the intermediate drum 45, as shown in FIGS. 1*a* and 1*b*, comprises a plurality of pairs of pusher arms 82, and a pair of axially movable pusher rings 84. The pusher arms 82, which extend through the guide block slots 58 and 62, are pivotally connected adjacent their axially inner ends as at 86 to the deck segments 46, and are pivotally connected adjacent their axially outer ends as at 88 to the pusher rings 84. The pusher arms 82 of each pair are disposed on opposite sides of the transverse center plane 32, lie in a common axial plane, and adjacent their axially inner ends are provided with gear teeth 90 which mesh on the transverse center plane 32. The pusher rings 84 are slidably supported on the main shaft 34, and include axially outwardly directed annular extensions 92.

Figure 14:
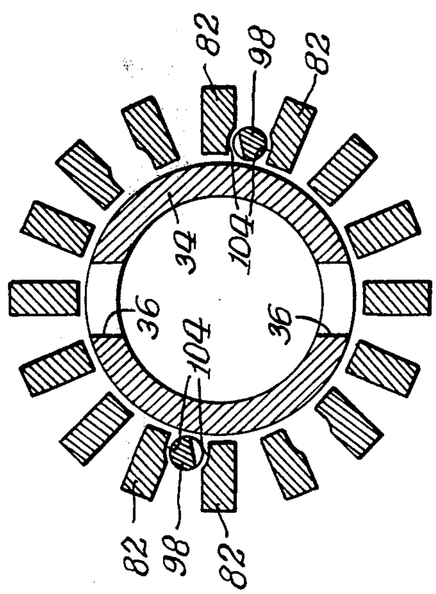
FIG. 14 is a sectional view taken substantially along the line 14—14 in FIG. 1*b* looking in the direction indicated by the arrows.

A pair of rack and pinion mechanisms 94, which serve as drum centering means, are provided at the opposite sides of the main shaft 34. Each mechanism 94, as shown in FIGS. 1*a*, 1*b*, 10 and 13, comprises a pinion 96, and a pair of oppositely axially extending rack members 98. The pinion 96 is rotatably mounted on a pin 100 within a housing 102 secured to the main shaft 34 within one of the guide block cavities 60, and has a fixed axis of rotation in the transverse center plane 32. The rack members 98 adjacent their axially inner ends have meshing engagement with the opposite sides of the pinion 96 and at their axially outer ends are connected to the pusher rings 84. As shown in FIG. 14, certain of the pusher arms 82 are formed with cut-outs 104 to accommodate the rack members 98 when the pusher arms 82 are in positions corresponding to the contracted position of the drum 45. The rack and pinion mechanisms 94 maintain the transverse center plane 32 of the drum 45 in a constant axial position during expansion and contraction of the drum 45.

As shown in FIGS. 1*a* and 1*b*, a pair of axially movable carrier means or units 106 are slidably supported on the main shaft 34 on opposite sides of the transverse center plane 32. Each carrier unit 106 comprises a main body section 108 defining an annular cylinder chamber 110, an axial sleeve section 112, a channel section 114 defining an axially inwardly directed annular cylinder channel 116, a ring-like guide section 118 defining a plurality of circumferentially spaced axial cylindrical guide openings 120, and a radial flange section 122.

An annular piston 124 is disposed in each of the carrier cylinder chambers 110, and divides the respective chamber 110 into outboard and inboard portions 126 and 128. The pistons 125 are connected by piston rods 130 to the pusher ring extensions 92 which are slidably supported on the carrier sleeve sections 112. The chambers 110, pistons 124 and piston rods 130 constitute fluid pressure operated means incorporated with the carrier units 106 for effecting at least partial actuation of the intermediate expansion drum means comprised of the pusher arms 82 and the pusher rings 84.

Also incorporated with each of the carrier units 106 is tired bead locating and supporting means 132 which includes: radially movable bead lock clamp means comprised of a plurality of circumferentially spaced arcuate bead lock clamp members 134; and axially movable bead lock clamp actuator means comprised of an annular piston assembly 136 disposed in the carrier cylinder channel 116, and a plurality of circumferentially spaced piston rods 138 secured to the piston assembly 136 and slidably supported in the carrier guide openings 120.

As shown in FIGS. 1*a*, 1*b*, 11 and 12, pairs of parallel links 140 are pivotally connected at their one ends as by pins 142 to the bead lock clamp members 134 and at their other ends as by pins 144 to the piston rods 138. The links 140 constitute parallelogram linkage means for transmitting force between the bead lock clamp actuator means and the bead lock clamp means, and for maintaining the transverse center plane 146 of the bead lock clamp members 134 parallel to the transverse center plane 32 of the drum assembly 30.

Figure 12:
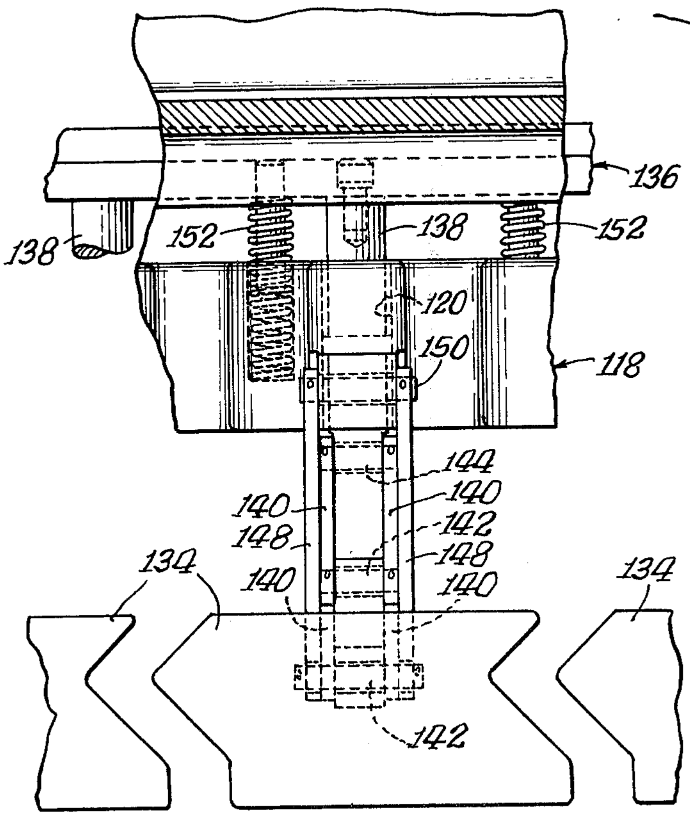
FIG. 12 is a view, partly in elevation and partly in section, taken substantially along the line 12—12 in FIG. 11 (and also in FIG. 1*b*) looking in the direction indicated by the arrows.
Figure 13:
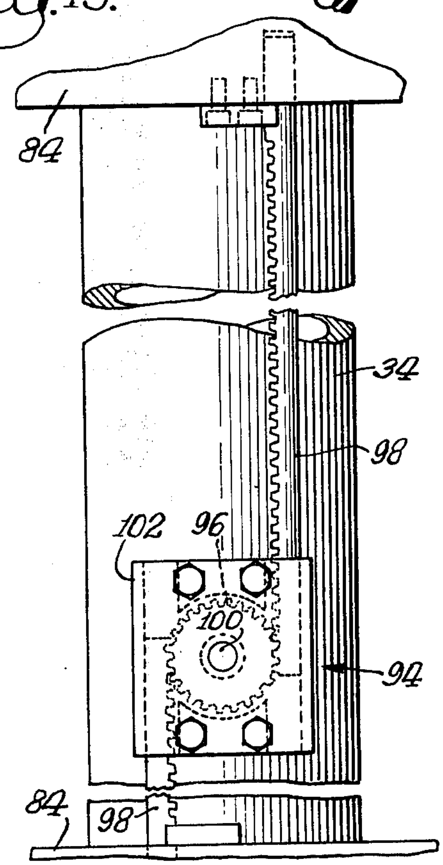
FIG. 13 is a foreshortened elevational view of the centering means for the intermediate drum, taken substantially along the line 13—13 in FIG. 10 looking in the direction indicated by the arrows.

In relation to each carrier unit 106, pairs of links 148 are pivotally connected at their one ends to the bead lock clamp members 134 on the axially inner pins 142 and at their other ends as by pins 150 to the carrier guide section 118. The links 148 constitute reaction linkage means whereby axial movement of the bead lock clamp actuator means effects through the parallelogram linkage means radial movement of the bead lock clamp means. Also, as shown in FIG. 12, a plurality of circumferentially spaced springs 152 are interposed between each carrier guide section 118 and the adjacent annular piston assembly 136 for biasing the latter axially outwardly.

Secured to the flange section 122 of each carrier unit 106, as shown in FIGS. 1*a* and 1*b*, is an annular end drum 154.

Figure 9:
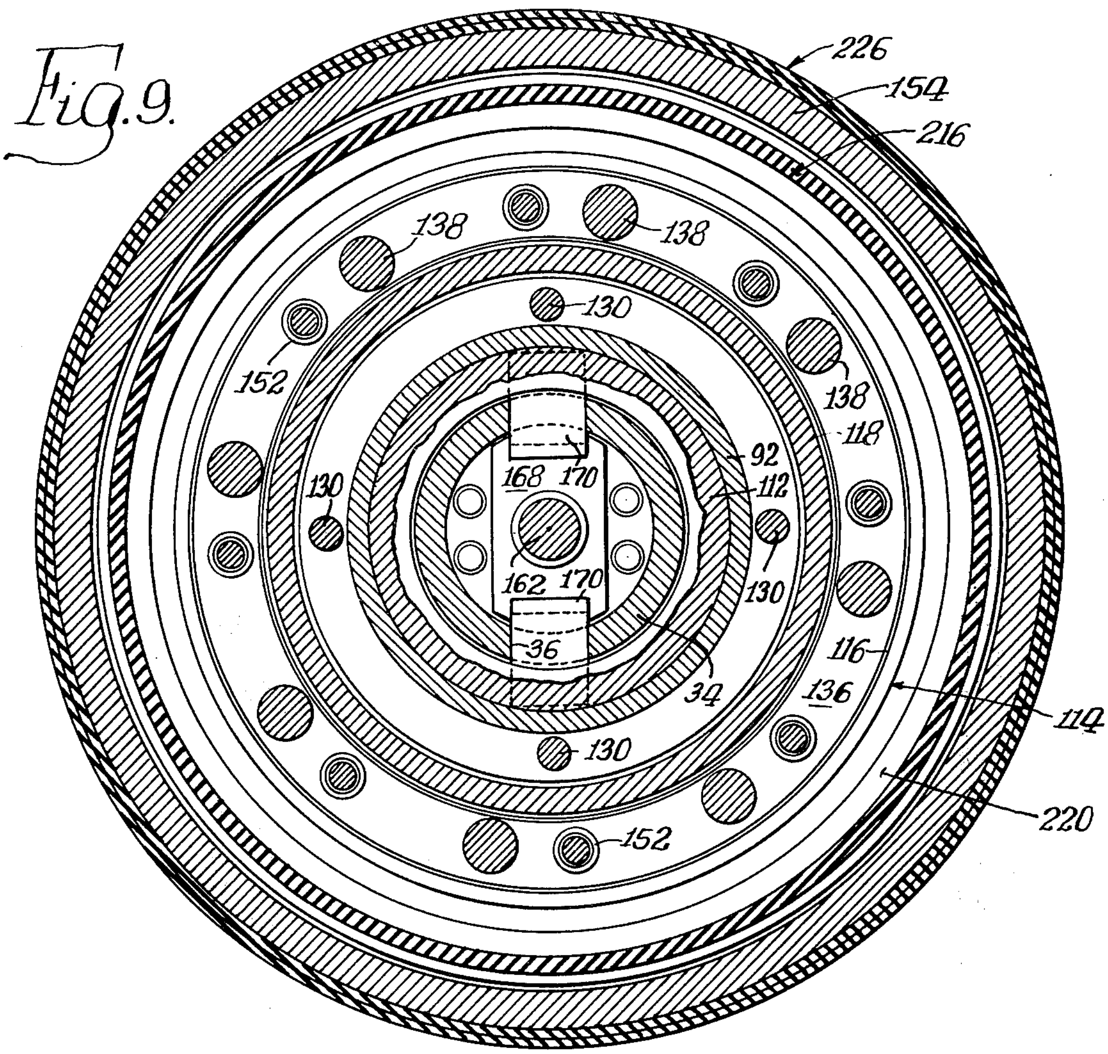
FIG. 9 is a sectional view taken substantially along the line 9—9 in FIG. 1*b* looking in the direction indicated by the arrows.
Figure 10:
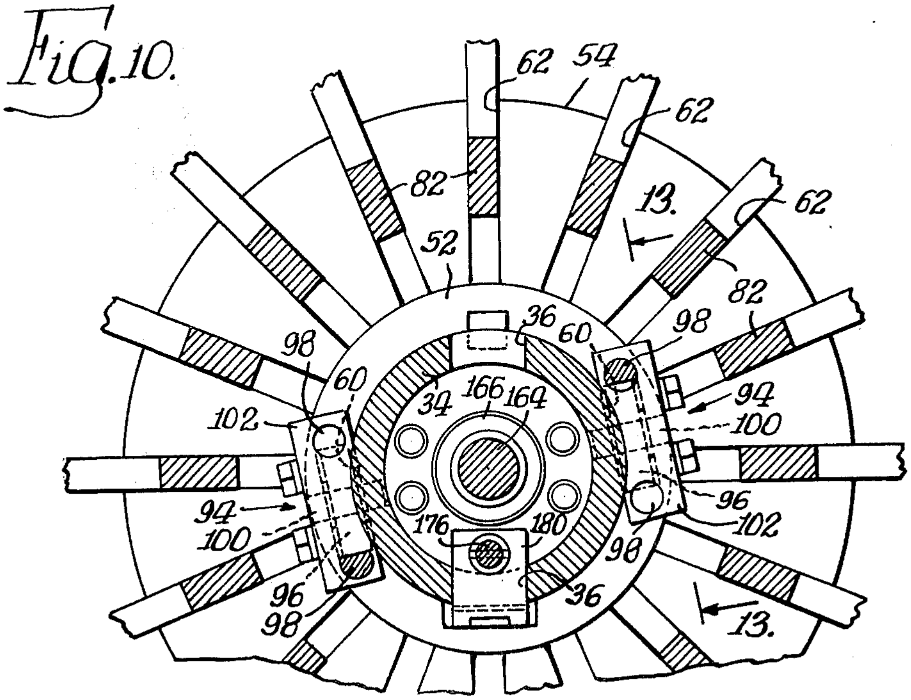
FIG. 10 is a sectional view taken substantially along the line 10—10 in FIG. 2 looking in the direction indicated by the arrows.

Positive drive means for axially moving the carrier units 106 toward and away from each other includes longitudinal inner shaft means 156 arranged within the hollow main shaft 34. The inner shaft means 156 comprises, as shown in FIGS. 1*a* and 1*b*, a right end shaft section 158 journaled in bearing means 160, a right hand threaded section 162 secured to the end shaft section 158, and a left hand threaded section 164 secured by a coupling 166 to the right hand threaded section 162. The threaded sections 162 and 164 are arranged on opposite sides of the transverse center plane 32. Ball nuts 168 have threaded engagement with the threaded sections 162 and 164, and each ball nut 168 carries a pair of ball nut adaptors 170 which project radially through the axial shaft slots 36 and are connected to the sleeve sections 112 of the adjacent carrier unit 106 (e.g., FIG. 9). The described positive drive means serves to axially move the carrier units 106 for effecting in conjunction with the fluid pressure operated means (elements 110, 124 and 130) actuation of the drum expanding and contracting means (elements 82 and 84), and serves to axially move the tire bead locating and supporting means 132 with the carrier units 106 symmetrically of the transverse center plane 32.

Positive stop means for establishing the axially innermost position of the pusher rings 84 includes a longitudinal spindle 172 arranged within the hollow shaft 34. The spindle 172 is formed with a right hand threaded section 174 and a left hand threaded section 176. A control rod 178 at its one end is connected to the spindle 172 and at its other end projects outwardly of the shaft support flange 38. Stop lugs 180 have threaded engagement with the threaded sections 174 and 176, project radially through the axial shaft slots 36, and are engageable by the pusher rings 84. The stop lugs 180 are axially adjustable by rotating the control rod 178 at its axially outer end. The expanded diameter of the drum 45 may be varied by varying the axial position of the stop lugs 180.

Figure 15:
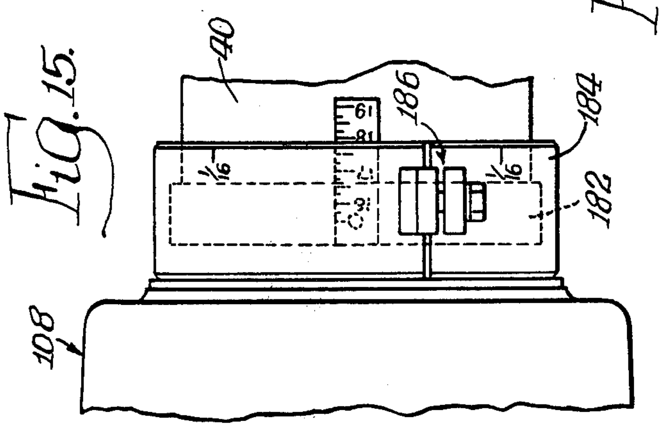
FIG. 15 is a plan view of the adjustable stop means of the tire building apparatus, taken substantially along the line 15—15 in FIG. 1*b* looking in the direction indicated by the arrows.

Positive stop means for establishing the axially outermost position of the carrier units 106 and of the tire bead locating and supporting means 132 includes, as shown in FIGS. 1*b* and 15, an externally threaded support member 182 secured to the axially inner end of the mounting flange 40, and a split collar 184 having threaded engagement with the support member 182. The collar 184 is axially adjustable by rotation thereof, is secured in place by clamp means 186, and is engageable by the main body section 108 of the right hand carrier unit 106 for establishing the exact tire bead set dimension of a tire to be constructed.

Figure 16:
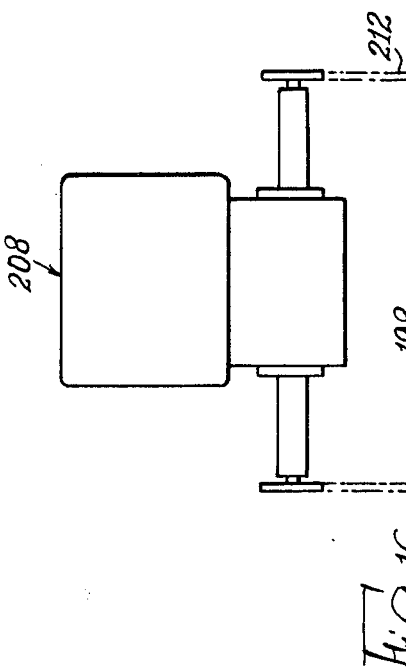
FIG. 16 is a diagrammatical view, partly in elevation and partly in section, of the power operated drive means of the tire building apparatus.
Figure 16:
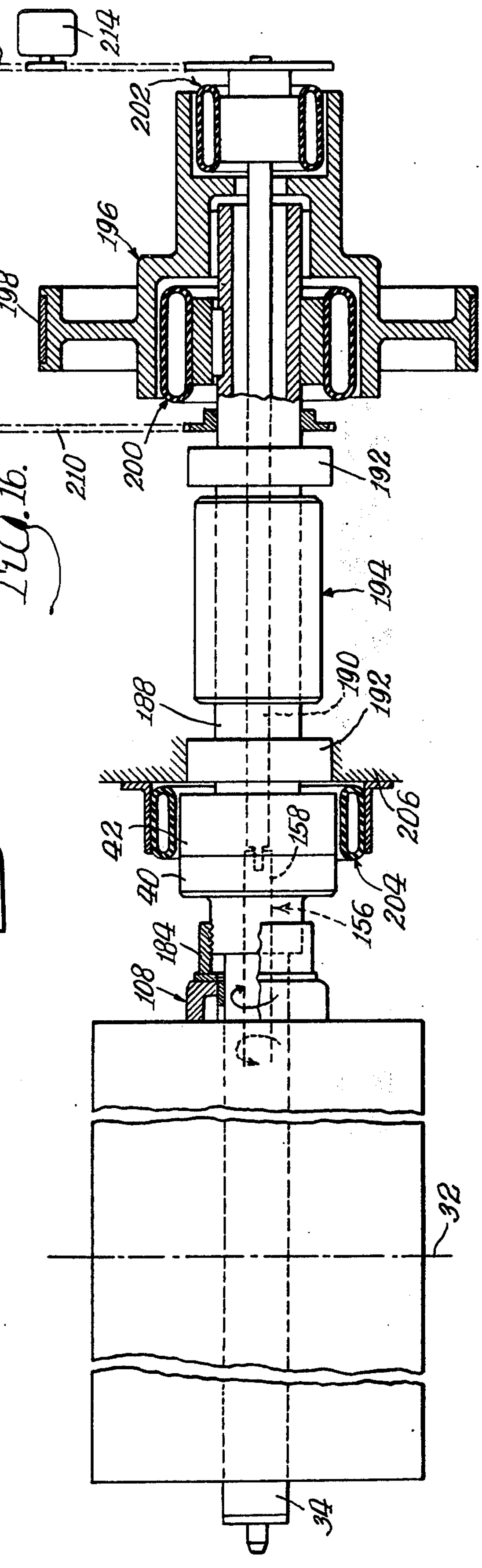

Power operated drive means for the main shaft 34 and the inner shaft means 156, as shown in FIG. 16, comprises a hollow outer shaft 188 connected to the flange portion 42, and an inner shaft 190 connected to the right end shaft section 158. The outer shaft 188 is journaled in bearings 192, and has associated therewith a rotary air coupling 194. A pulley assembly 196 is rotatably mounted about the shafts 188 and 190, and is connected to a suitable reversible drive motor (not shown) by a belt 198. An air clutch 200 is provided between the pulley assembly 196 and the outer shaft 188, an air clutch 202 is provided between the pulley assembly 196 and the inner shaft 190, and an air brake 204 is provided between the flange member 42 of the outer shaft 188 and a stationary frame member 206. Control means for the power operated drive means includes rotary limit switch means 208 connected by chains 210 and 212 to the shafts 188 and 190 respectively, and zero speed switch means 214 connected to the chain 212.

When the drum 45 is being expanded during the construction of a tire, and to transmit the magnitude of torque required therefor, air under relatively high pressure is introduced into the air clutch 202. During this time, air under pressure is introduced into the air brake 204 thereby holding the mounting flange 40, flange portion 42 and main shaft 34 stationary. When the drum 45 is being contracted, and to accommodate use of the adjustable bead set collar 184, air under relatively low pressure is introduced into the air clutch 202. As the right hand carrier unit 106 moves axially outwardly into engagement with the bead set collar 184, the pulley assembly 196 momentarily slips over the air clutch 202 thereby preventing damage to the apparatus, and then the switch means 214 stops the drive motor connected to the pulley assembly 196. If there is a malfunction of the apparatus during drum expansion or collapse, the air clutch 202 will slip causing actuation of the zero speed switch means 214 thus stopping the drive motor preventing damage to the apparatus.

Mounted about the intermediate drum 45, as shown in FIGS. 1*a* and 1*b*, is an elastic drum sleeve 216. The enlarged annular end portions 218 of the sleeve 216 are retained in end ring means 220 to which axial threaded studs 222 are secured. The studs 222 project through apertures in the carrier flange section 122, and have threaded engagement with threaded adjusting sleeves 224 whereby the axially spaced positions of the ring means 220 may be adjusted for purposes of tensioning the sleeve 216.

Supported by each of the drums 154, as shown in FIGS. 1*a* and 1*b*, is an inflatable ply turn-up bag means 226. Each ply turn-up bag means 226 is of envelope configuration, and comprises radially inner and outer layers 228 and 230. Each inner layer 228 is formed with a truncated portion 232 secured to the axially inner edge of the adjacent end drum 154 by a ring member 234. The truncated portions 232 are ported for admitting fluid under pressure into the ply turn-up bag means 226 to effect inflation of the same. The axially inner ends 236 of the ply turn-up bag means 226 are tapered and engage the sleeve 216 at the locations of the bead lock clamp members 134.

Figure 17:
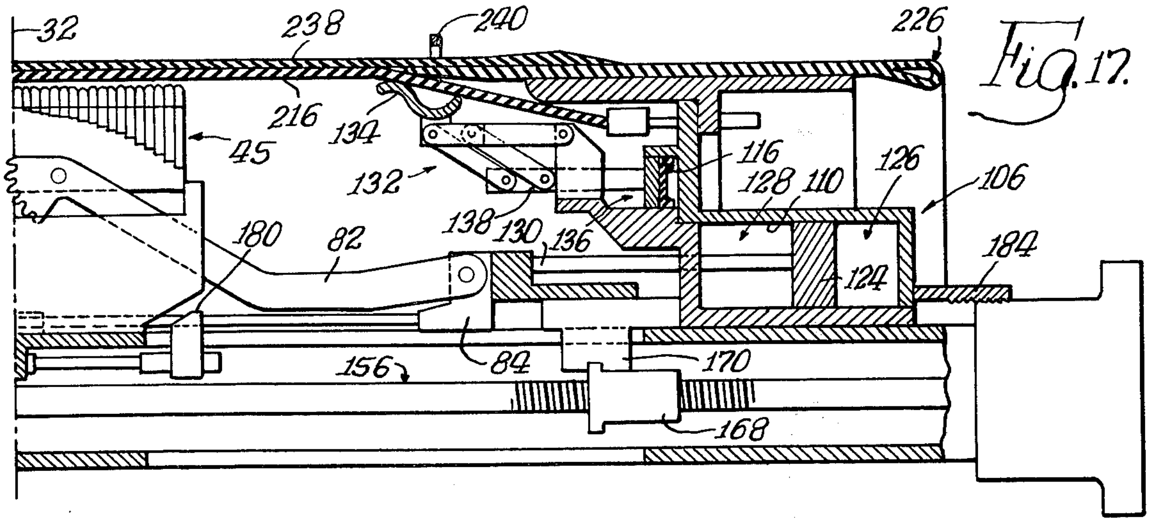
FIGS. 17–25 are diagrammatical longitudinal sectional views corresponding generally to the upper portion of FIG. 1*b*, and show various positions of the components of the tire building apparatus in forming a tire.

The operation of the tire building apparatus is essentially as follows:

In FIGS. 1*a* and 1*b*, the several parts are shown in their inactive positions. Initially, the bead set collar 184 is adjusted for the desired tire bead set dimension, the inner shaft means 156 is rotated for moving the right hand carrier unit 106 into engagement with the bead set collar 184, and the stop lugs 180 are adjusted for the desired expanded diameter of the drum 45. Then, in a conventional manner and as shown in FIG. 17, tire carcass and sidewall material 238 are applied over the elastic drum sleeve 216 and the ply turn-up bag means 226, and tire beads 240 are positioned radially outwardly of the bead lock clamp members 134 by bead holders (not shown).

Figure 11:
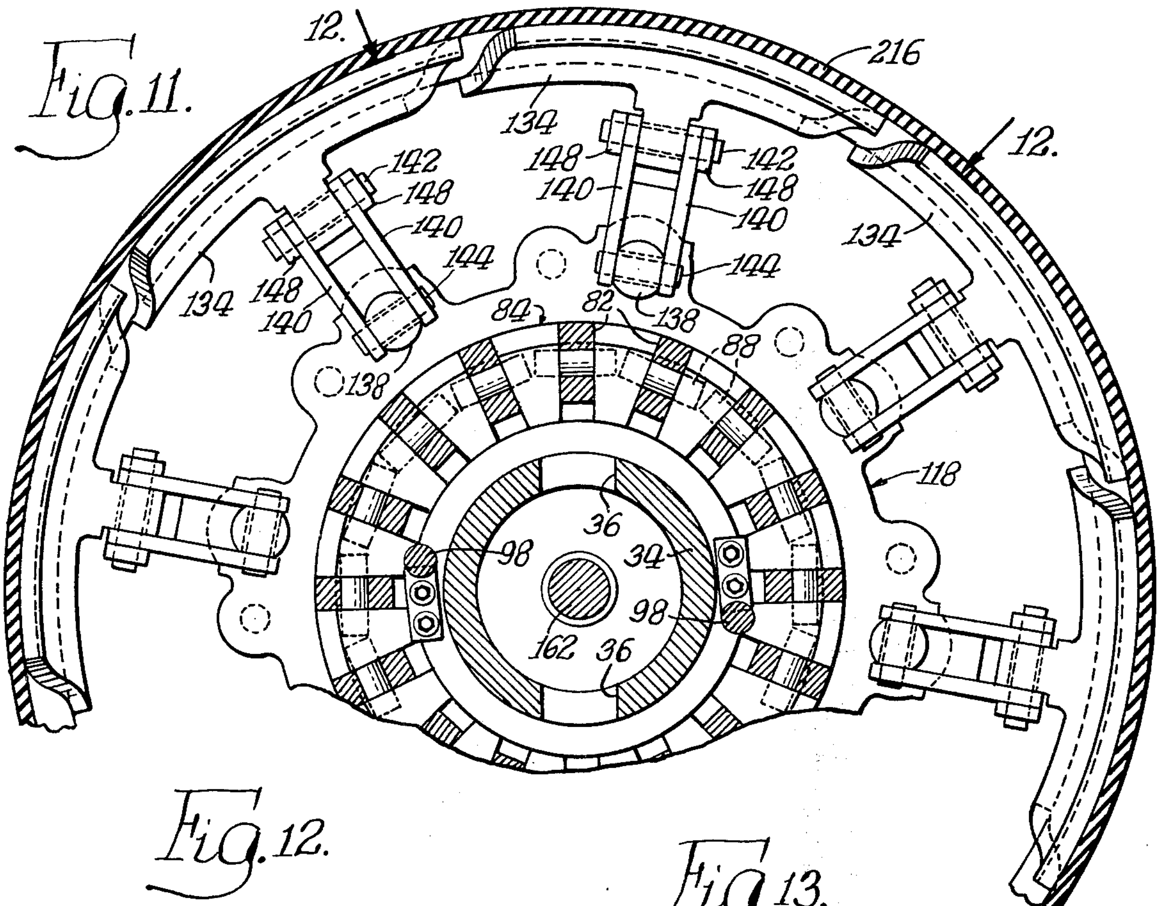
FIG. 11 is a sectional view taken substantially along the line 11—11 in FIG. 1*b* looking in the direction indicated by the arrows, but showing the bead lock clamp means in expanded position.
Figure 18:
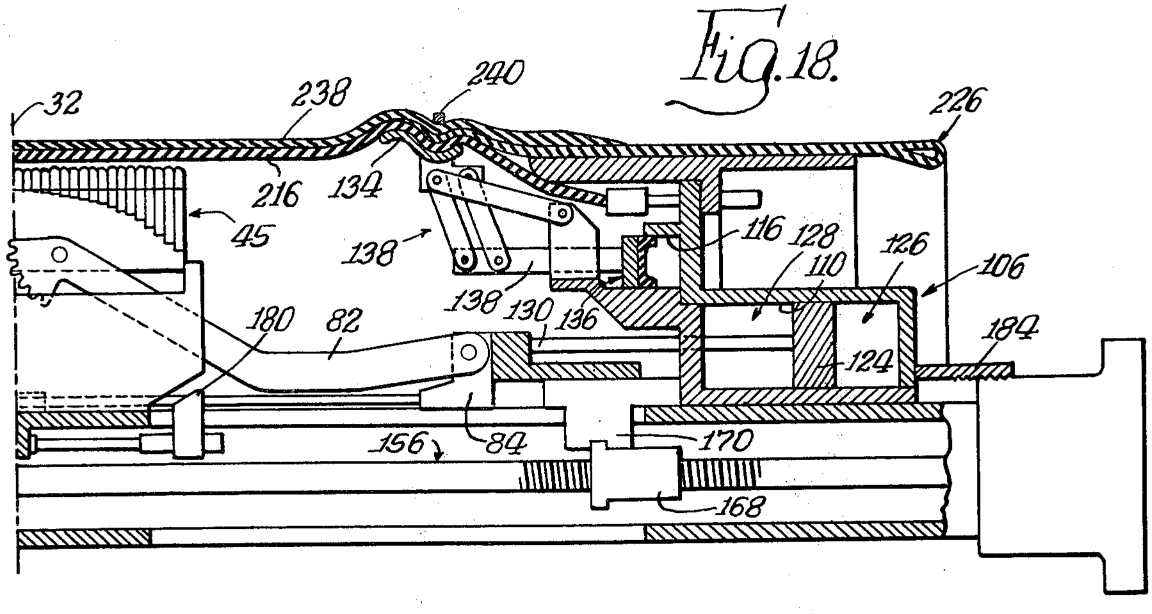

Air under pressure is next introduced into the carrier cylinder channels 116. As shown in FIG. 18, the annular piston assemblies 136 and the piston rods 138 are moved axially inwardly, and the bead lock clamp members 134 are moved radially outwardly to engage or lock accurately and concentrically the tire material 238 with the tire beads 240. The bead lock positions of the clamp members 134 are also shown in FIG. 11.

Figure 19:
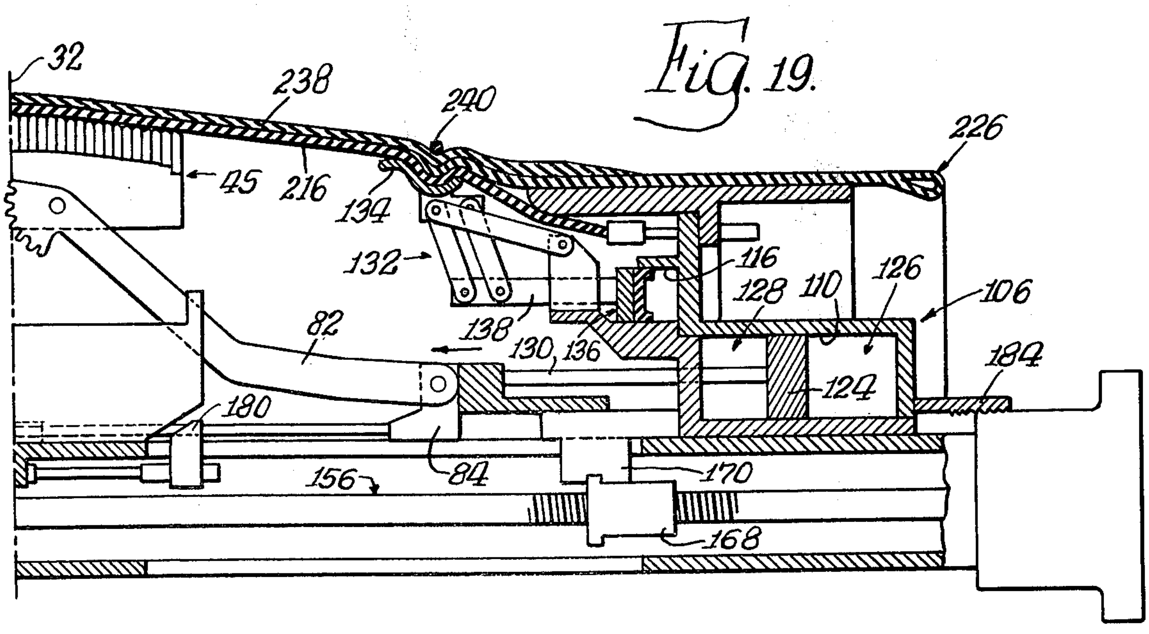

Air under pressure is then introduced into the outboard portions 126 of the carrier cylinder chambers 110. As shown in FIG. 19, the pistons 124 and the piston rods 130 are moved axially inwardly, thereby effecting axial inward movement of the pusher rings 84, radial outward movement of the axially inner ends of the pusher arms 82, and initial resilient expansion of the drum 45 to place the tire material 238 under tension. At this stage of operation, the drum 45 expands until restrained by the axial cords of the tire material 238, and the tension thus imposed on the cords of the tire material 238 may be controlled by varying the air pressure in the outboard portions 126 of the carrier cylinder chambers 110.

Figure 2:
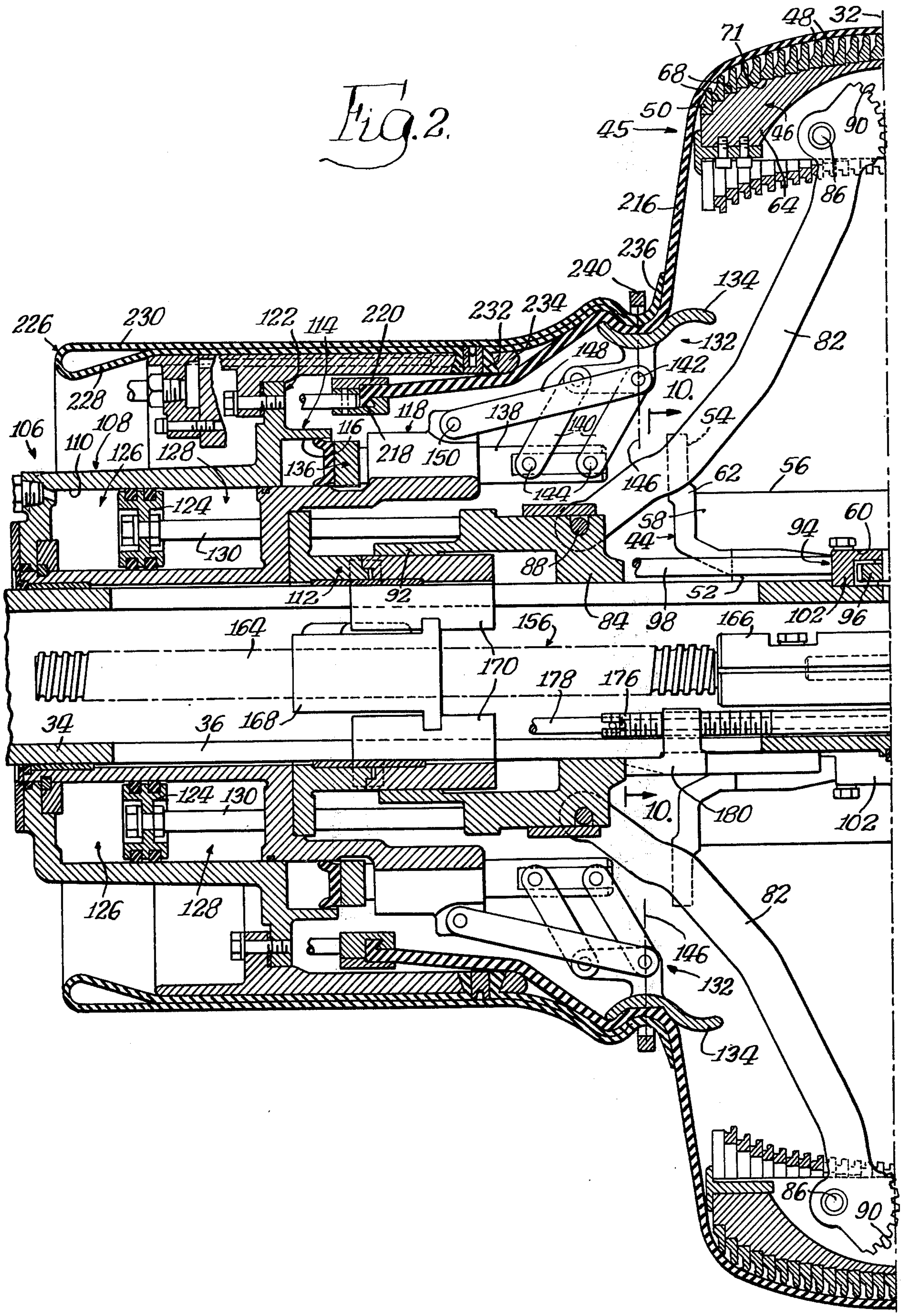
FIG. 2 is a longitudinal sectional view corresponding generally to the left half of FIG. 1, but showing the intermediate drum in expanded position.
Figure 20:
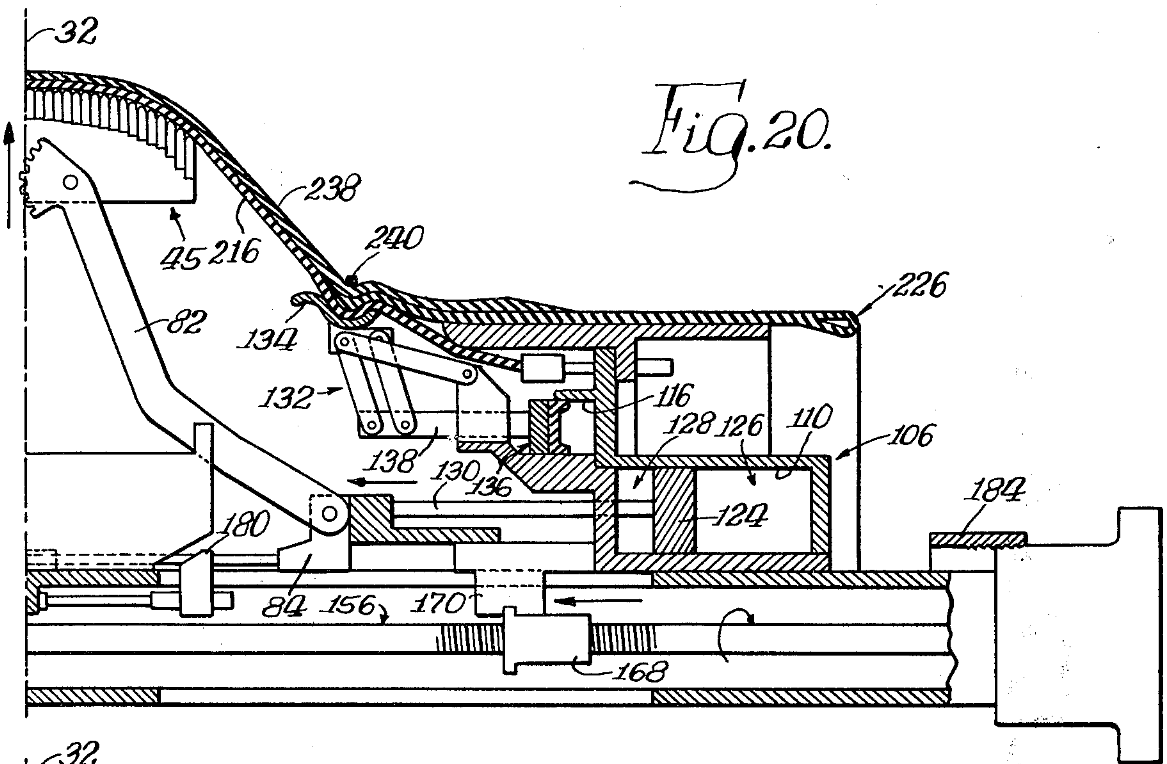
Figure 21:
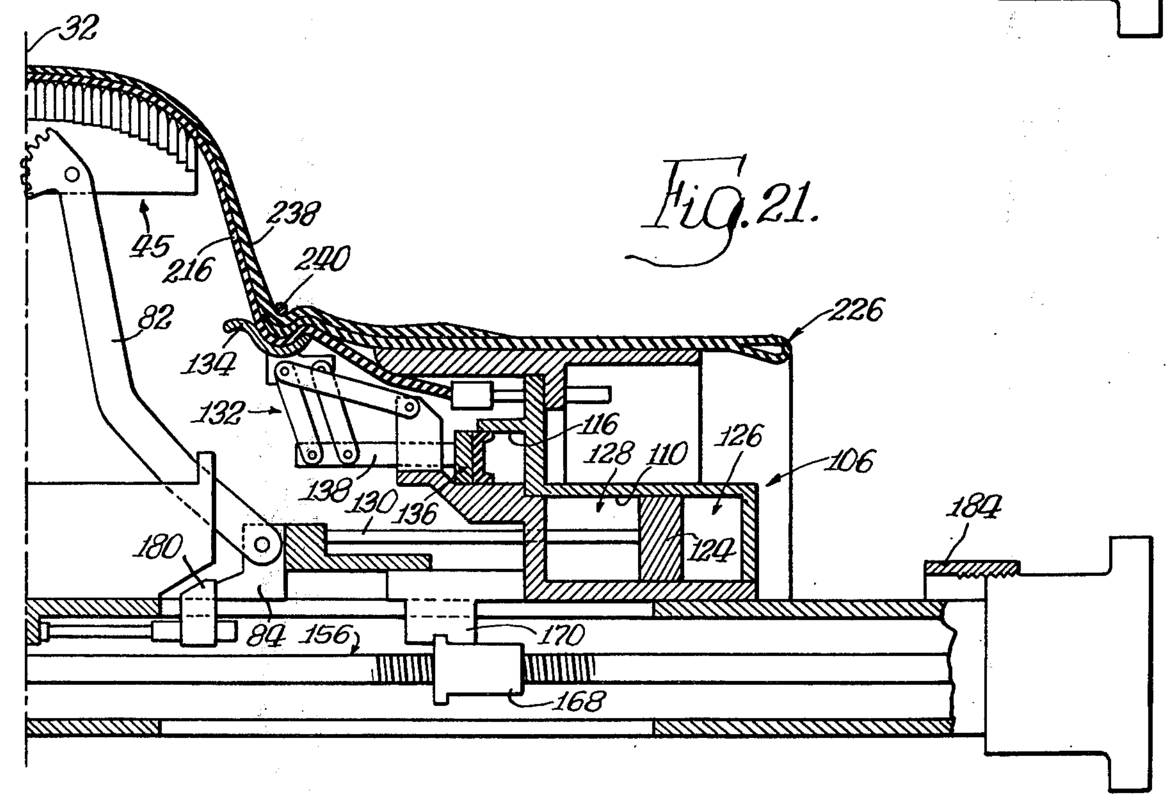

The air clutch 202 (FIG. 16) is activated for causing rotation of the inner shaft 190 and the inner shaft means 156 in the direction indicated by the solid arrow. Rotation of the shaft means 156 in turn effects axial inward movement of the ball nuts 168, ball nut adaptors 170 and the carrier units 106, further radial outward movement of the axially inner ends of the pusher arms 82, and further expansion of the drum 45, from the positions shown in FIG. 19, through the positions shown in FIG. 20, to the positions shown in FIG. 21 where the pusher rings 84 contact the stop lugs 180. During this expansion of the drum 45, the bead lock clamp members 134 and the locked beads 240 are moved axially inwardly with the carrier units 106 symmetrically of the transverse center plane 32, and the tire material 238 is maintained taut by the air pressure in the outboard portions 126 of the carrier cylinder chambers 110 acting on the pistons 124 connected by the piston rods 130 to the pusher rings 84. The described arrangement and actuation of the carrier units 106 and tire bead locating and supporting means 132 allows the locked beads 240 to approach positions directly radially inwardly of the shoulders of the tire under construction. When the pusher rings 84 contact the stop lugs 180, rotation of the inner shaft means 156 is discontinued. The fully expanded position of the drum 45 (FIG. 21) is also shown in FIG. 2 and in dotted lines in FIG. 3.

Figure 22:
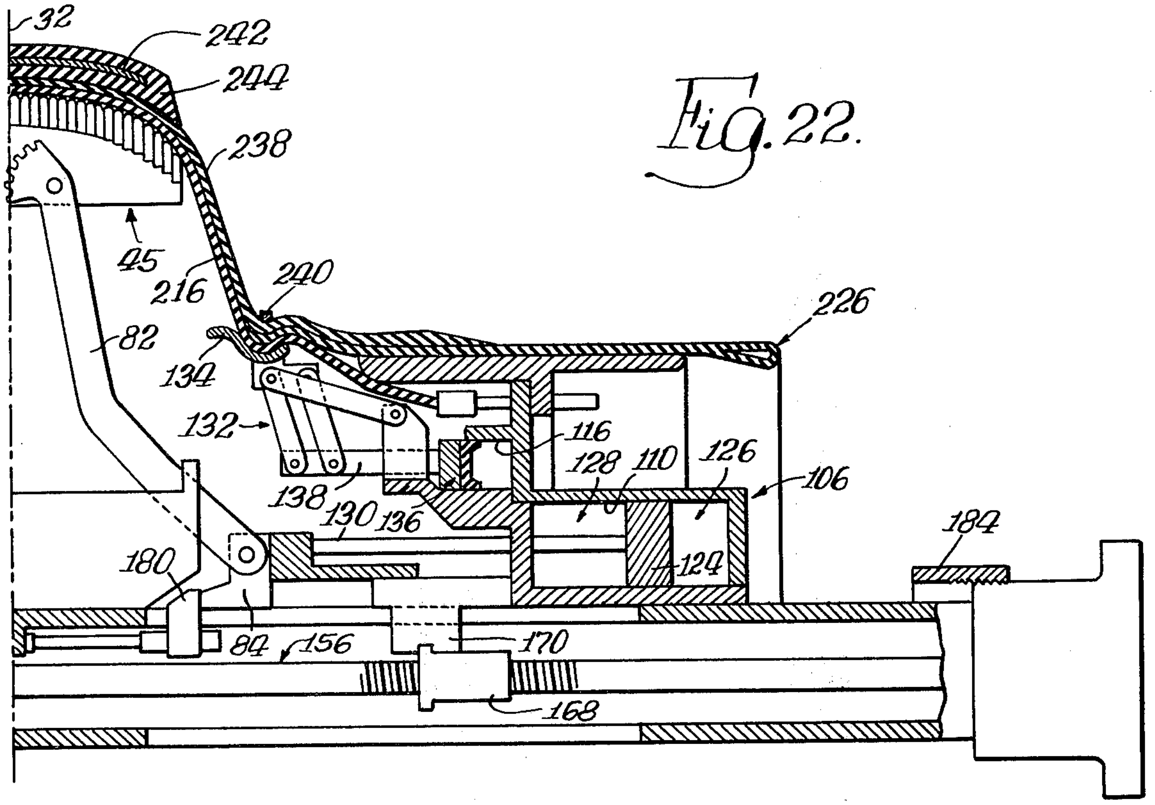
Figure 23:
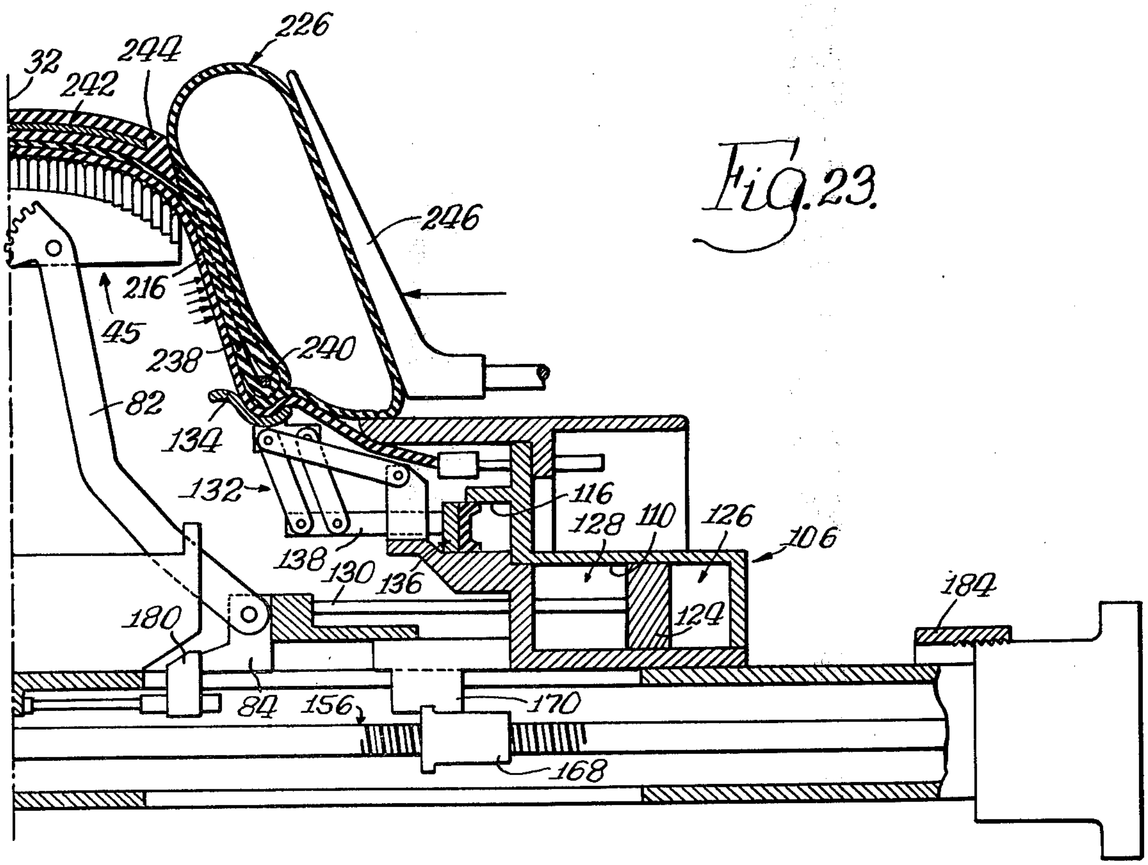

Thereafter, in a conventional manner, breaker and tread cap components 242 and 244 are applied to the partially preformed tire carcass (FIG. 22), and the sidewall portions of the tire material 238 are turned up by inflation of the ply turn-up bag means 226 and axial inward movement of pusher rings 246 (FIG. 23).

Figure 24:
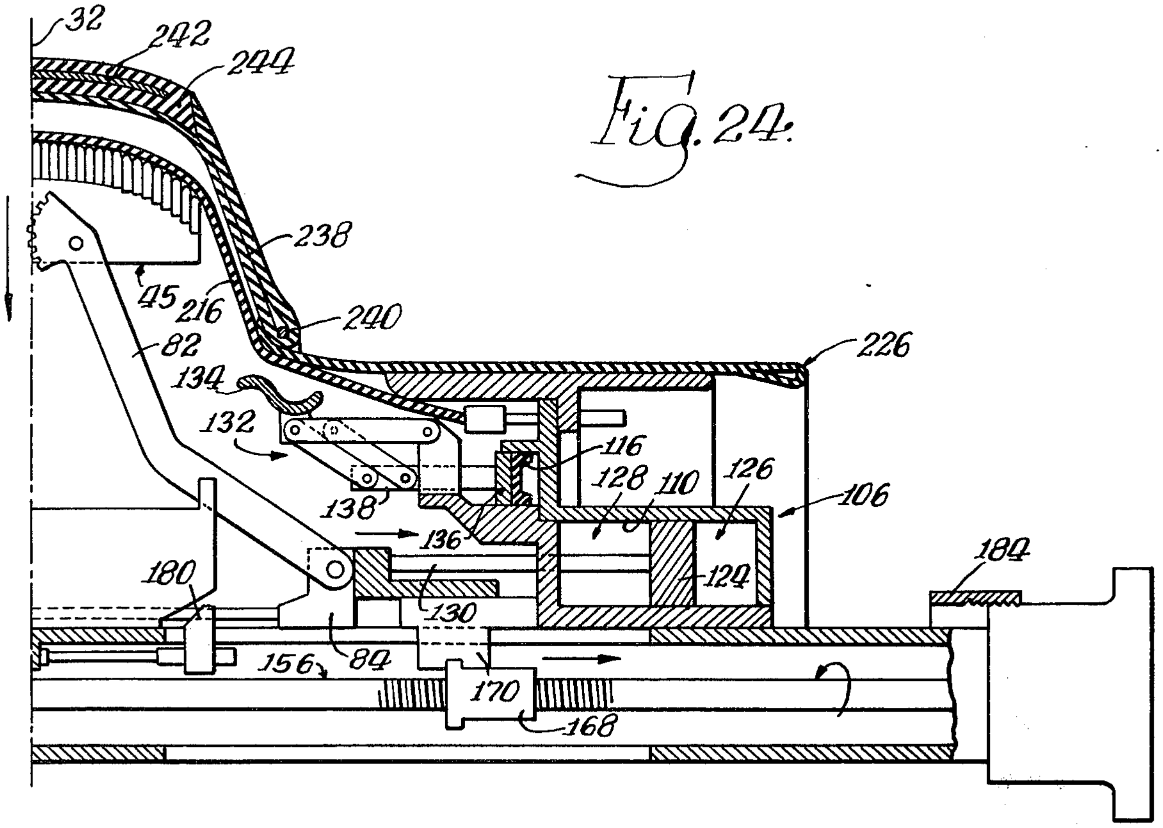
Figure 25:
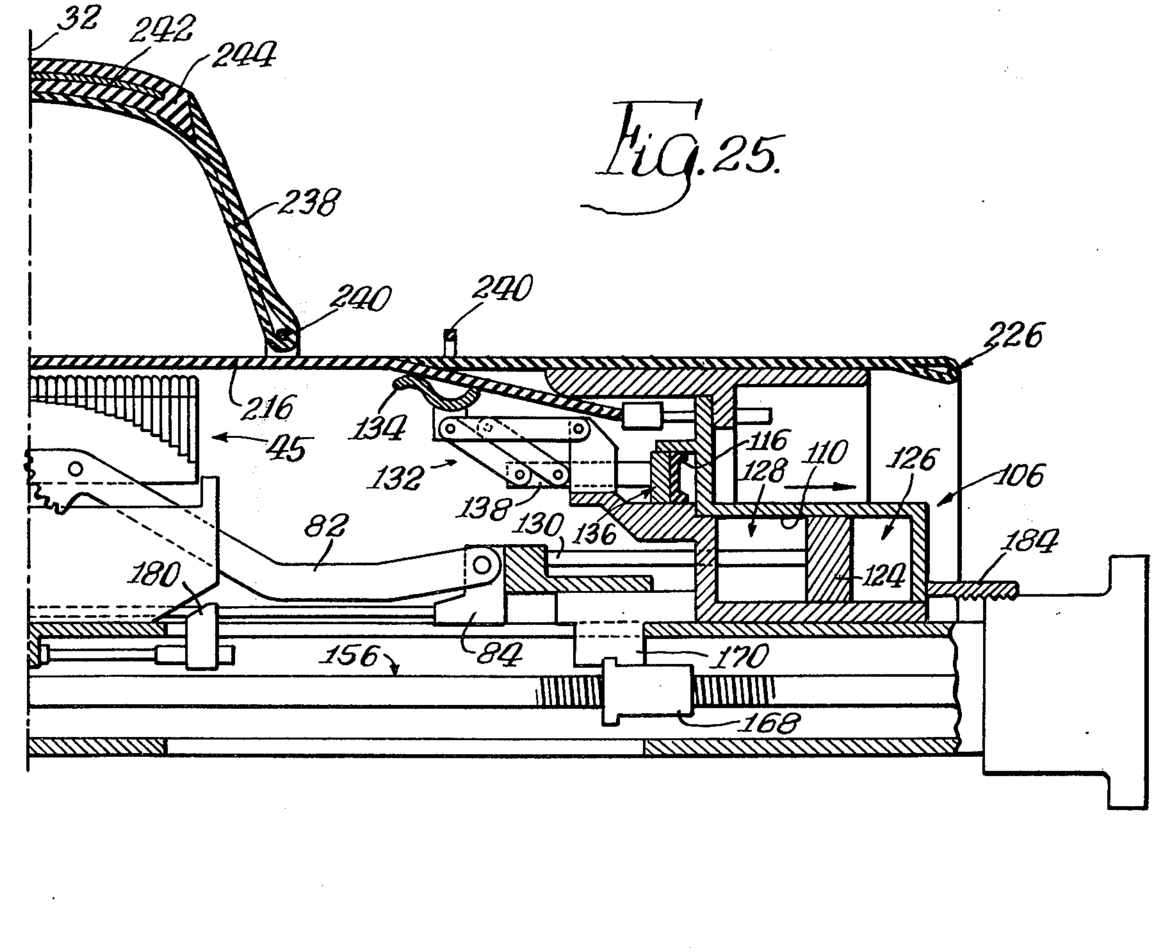

Finally, the pusher rings 246 are returned axially outwardly, the ply turn-up bag means 226 are deflated, air pressure is bled from the carrier cylinder channels 116 permitting the bead lock clamp members 134 to be returned by the springs 152 (FIG. 12) to their inactive positions, air pressure is bled from the outboard portions 126 of the carrier cylinder chambers 110, air under pressure is introduced into the inboard portions 128 of the carrier cylinder chambers 110, and the air clutch 202 (FIG. 16) is activated for causing rotation of the inner shaft means in the direction indicated by the dotted arrow. In this manner, the drum 45 is collapsed from the position shown in FIG. 23 through the position shown in FIG. 24 to the fully collapsed position shown in FIG. 25 permitting removal of the completed truly symmetrical tire carcass. Also, as previously described, engagement of the right hand carrier unit 106 with the collar 184 interrupts rotation of the inner shaft means 156 and establishes the exact tire bead set dimension for the next tire to be constructed.

While there has been shown and described a preferred embodiment of the present invention, it will be understood by those skilled in the art that various rearrangements and modifications may be made therein without departing from the spirit and scope of the invention.

The invention claimed is:

1. A tire building apparatus for building a complete tire in a single operation, the apparatus having an intermediate radially expandable drum, intermediate drum expanding and contracting means associated with the intermediate expandable drum to dispose the same in positions defining rigid supporting surfaces of different radii, and end drum assembly at each end of the intermediate drum, the intermediate drum and the end drum assemblies providing support of tire carcass material therearound, and the end drum assemblies having tire bead locating and supporting means for the beads of the tire carcass and ply turn up means, the combination including resilient expansion means as part of the intermediate drum expanding and contracting means for effecting at least a partial actuation of the intermediate drum expansion means, and positive centering means for axially positioning the intermediate drum to maintain the center line of the tire carcass midway between the beads of the tire carcass.

2. The tire building apparatus of claim 1 wherein the intermediate drum expanding and contracting means includes at least one pair of pusher arms on opposite sides of said center line of the tire carcass and having gear teeth which mesh on said center line and wherein said positive centering means has connection with said pusher arms.

3. The tire building apparatus of claim 2 wherein said positive centering means includes at lease one rack and pinion mechanism to maintain said center line midway between the beads of the tire carcass.

4. The tire building apparatus in accordance with claim 1 wherein the end drum assemblies each include an axially movable carrier means and said resilient expansion means is incorporated with said carrier means and the intermediate drum expanding and contracting means includes positive drive means for axially moving said carrier means toward and away from each other.

5. The tire building apparatus of claim 4 wherein said positive drive means includes a rotatable shaft having right-hand and left-hand threaded sections, and nut means threaded on said threaded sections and having connection with said carrier means.

6. The tire building apparatus in accordance with claim 1 wherein the intermediate drum expanding and contracting means includes a pair of axially movable pusher rings on opposite sides of said center line, at least one pair of pusher arms on opposite sides of said center line and in a common axial plane, said pusher arms being pivotally connected at their axially outer ends to said pusher rings and pivotally connected at their axially inner ends to said intermediate drum, and said pusher arms adjacent their axially inner ends having gear teeth which mesh on said center line; wherein said resilient expansion means has connection with said pusher rings; and wherein said positive centering means has connection with said pusher rings.

7. The tire building apparatus of claim 6 including positive stop means engageable by said pusher rings for establishing the axially innermost positive of the latter and thereby the expanded diameter of said intermediate drum.

8. The tire building apparatus of claim 6 wherein said positive centering means includes at least one pinion having a fixed axis of rotation in said center line, and a pair of oppositely axially extending rack members meshing with the opposite sides of said pinion and connected to said pusher rings.

9. The tire building apparatus of claim 5 including tire bead locating and supporting means incorporated with each of said carrier means, and end drums secured to each of said carrier means.

10. The tire building apparatus of claim 9 including positive stop means engageable by said carrier means for establishing the axially outer position of the latter and of said tire bead locating and supporting means.

11. The tire building apparatus of claim 9 including slip clutch drive means connected to said rotatable shaft, said slip clutch permitting slippage of said rotatable shaft upon engagement of said carrier means with said stop means.

12. Tire building apparatus comprising an intermediate radially expandable drum having a transverse center plane; a pair of axially movable carrier means on opposite sides of said transverse center plane; tire bead locating and supporting means incorporated with each of said carrier means; and each of said tire bead locating and supporting means including radially movable bead lock clamp means, axially movable bead lock clamp actuator means, parallelogram linkage means connected intermediate said bead lock clamp actuator means and said bead lock clamp means for transmitting force there between and for maintaining the transverse center plane of said bead lock clamp means parallel to said transverse center plane, and reaction linkage means connected intermediate said bead lock clamp means and said carrier means whereby axial movement of said bead lock clamp actuator means effects through said parallelogram linkage means radial movement of said bead lock clamp means.

13. The tire building apparatus of claim 12 including positive drive means for axially moving said carrier means toward and away from each other whereby said tire bead locating and supporting means is moved axially toward said transverse center plane symmetrically of the latter.

14. The tire building apparatus of claim 13 including positive stop means engageable by said carrier means for establishing the axially outermost position of the latter and of said tire bead locating and supporting means.

15. A tire building apparatus for building a complete tire in a single operation, the apparatus having an intermediate radially expandable drum, intermediate drum expanding and contracting means associated with the intermediate expandable drum to dispose the same in positions defining rigid supporting surfaces of different radii, an end drum assembly at each end of the intermediate drum with each end drum assembly including an axially movable carrier means having end drums secured thereto, ply turn up means and tire bead locating and supporting means for the beads of the tire carcass incorporated with the carrier means, the intermediate drum and end drum assemblies providing support of tire carcass material therearound, the intermediate drum expanding and contracting means having positive drive means for axially moving said carrier means toward and away from each other, said positive drive means including a rotatable shaft having right-hand and left-hand threaded sections and nut means threaded on said threaded sections and having connection with said carrier means, said tire bead locating and supporting means includes radially movable bead lock clamp means, axially movable bead lock clamp actuator means, parallelogram linkage means connected intermediate said bead lock clamp actuator means and said bead lock clamp means for transmitting force therebetween and for maintaining the center line of said bead lock clamp means parallel to said center line and reaction linkage means connected intermediate said bead lock clamp means and said carrier means whereby axial movement of said bead lock clamp actuator means effects through said parallelogram linkage means radial movement of said bead lock clamp means the combination including resilient expansion means as part of the intermediate drum expanding and contracting means and incorporated with said carrier means for effecting at least a partial actuation of the intermediate drum expansion means, and positive centering means for axially positioning the intermediate drum to maintain the center line of the carcass midway between the beads of the tire carcass.

16. A method of building a complete tire comprising the steps of:

forming tire carcass material in substantially the form of a cylinder, positioning tire beads on said tire carcass material inwardly opposite ends of said tire carcass material, clamping said tire carcass material to said tire beads, tensioning radially outwardly said tire carcass material between said tire beads, moving positively said tire beads on said carcass material axially inwardly towards one another and expanding said tire carcass material between said tire beads with at least partial resilient expansion means while maintaining the centerline of said carcass material between said tire beads, stopping positively the expansion of said tire carcass material between said tire beads and axially inward movement of said tire beads towards one another, and turning up said opposite ends of said tire carcass material to encase said tire beads within said tire carcass material and applying breaker and tread components about the center line of the outer periphery of expanded position of the tire carcass material to produce a complete tire.

* * * * *